(12) United States Patent
Bagepalli et al.

(10) Patent No.: US 8,866,362 B2
(45) Date of Patent: Oct. 21, 2014

(54) LAMINATION STACK FOR AN ELECTRICAL MACHINE STATOR

(75) Inventors: Bharat Bagepalli, Niskayuna, NY (US); Robert Michael Zirin, Niskayuna, NY (US); Randy Scott Longtin, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 343 days.

(21) Appl. No.: 13/280,840

(22) Filed: Oct. 25, 2011

(65) Prior Publication Data

US 2013/0099504 A1 Apr. 25, 2013

(51) Int. Cl.
*H02K 1/18* (2006.01)

(52) U.S. Cl.
USPC .............................. 310/216.016; 310/216.019

(58) Field of Classification Search
None
See application file for complete search history.

(56) References Cited

U.S. PATENT DOCUMENTS

| | | | |
|---|---|---|---|
| 3,045,133 A | 7/1962 | Aske | |
| 3,845,340 A * | 10/1974 | Brooks et al. | 310/216.016 |
| 6,747,388 B2 | 6/2004 | Takano et al. | |
| 7,154,192 B2 | 12/2006 | Jansen et al. | |
| 7,154,193 B2 | 12/2006 | Jansen et al. | |
| 7,548,008 B2 | 6/2009 | Jansen et al. | |
| 7,557,486 B2 | 7/2009 | Choi et al. | |
| 7,692,357 B2 | 4/2010 | Qu et al. | |
| 7,750,521 B2 | 7/2010 | Qu et al. | |
| 7,839,049 B2 | 11/2010 | Jansen et al. | |

* cited by examiner

*Primary Examiner* — Tran Nguyen
(74) *Attorney, Agent, or Firm* — Dority & Manning, P.A.

(57) ABSTRACT

An electrical machine stator is disclosed that includes a stack of laminations configured to be assembled together so as to define at least one stator tooth. The stack of laminations may include a plurality of nesting laminations and a plurality of shim laminations. Each nesting lamination may include a first edge section, a second edge section and a middle section extending between the first and second edge sections. At least one of the first edge section and the second edge section of each nesting lamination may be configured to be engaged against at least one of the first edge section and the second edge section of an adjacent nesting lamination when the stack of laminations is assembled together. Additionally, at least one shim lamination may be disposed between each pair of adjacent nesting laminations.

19 Claims, 10 Drawing Sheets

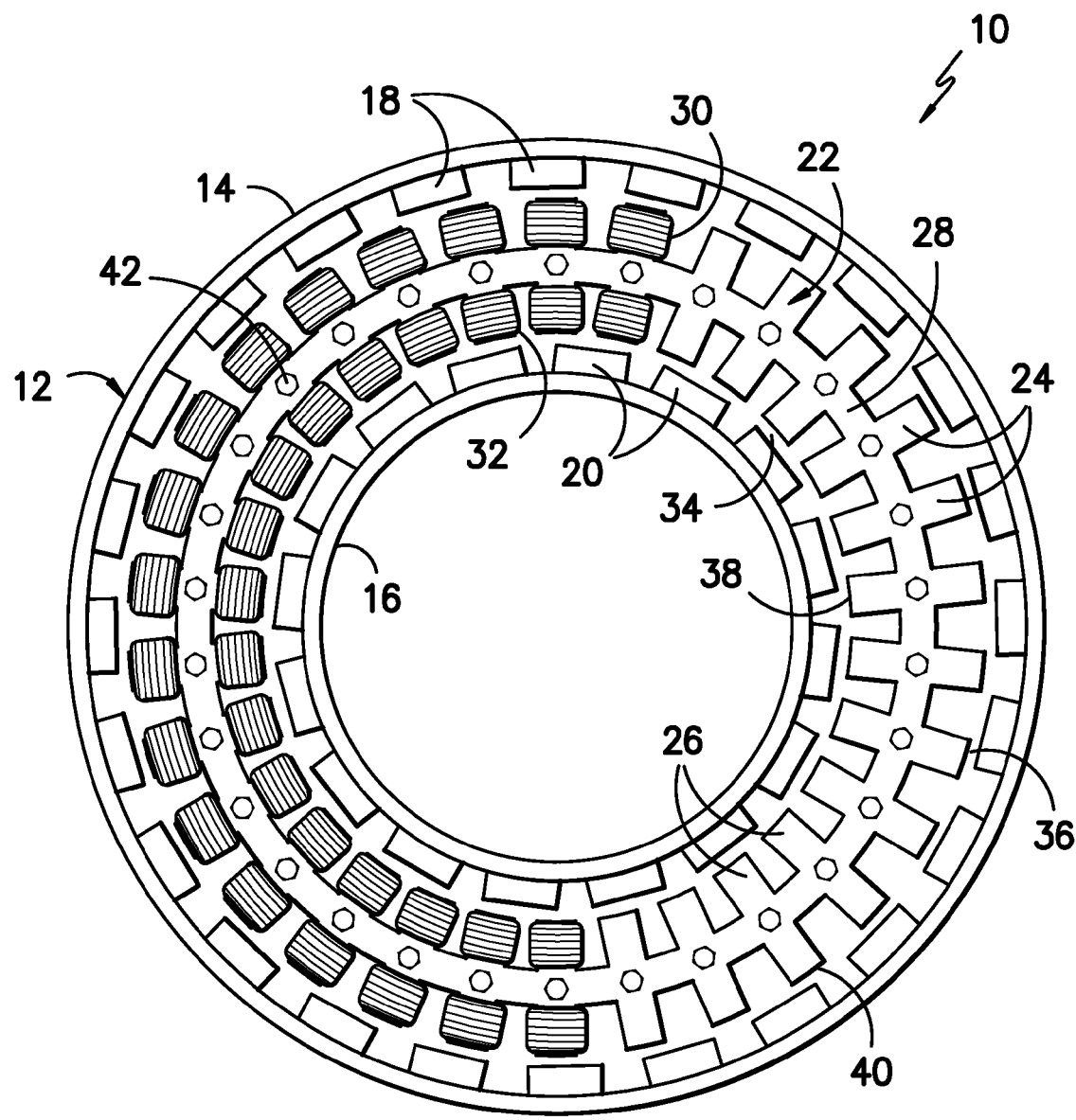
FIG. −1−

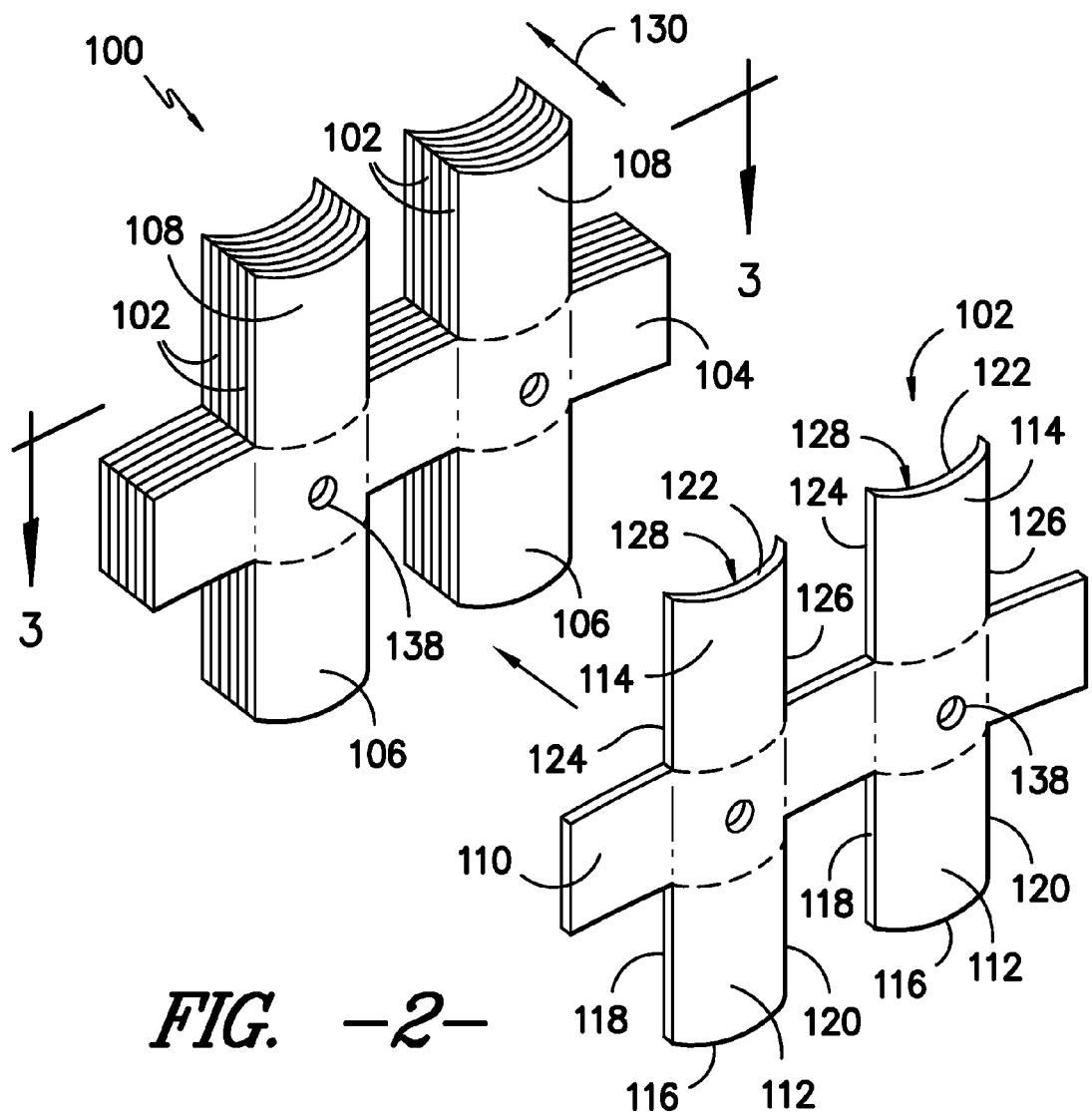
FIG. -2-
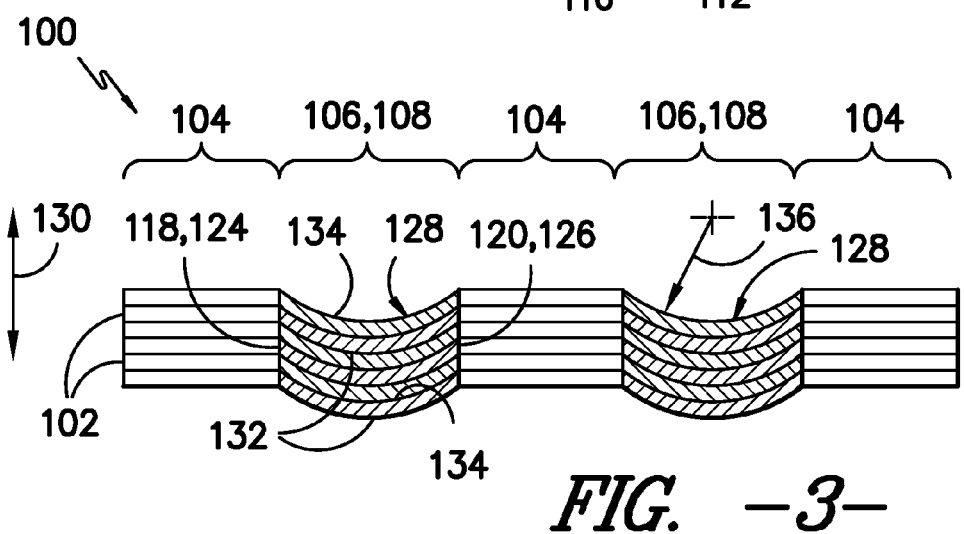
FIG. -3-

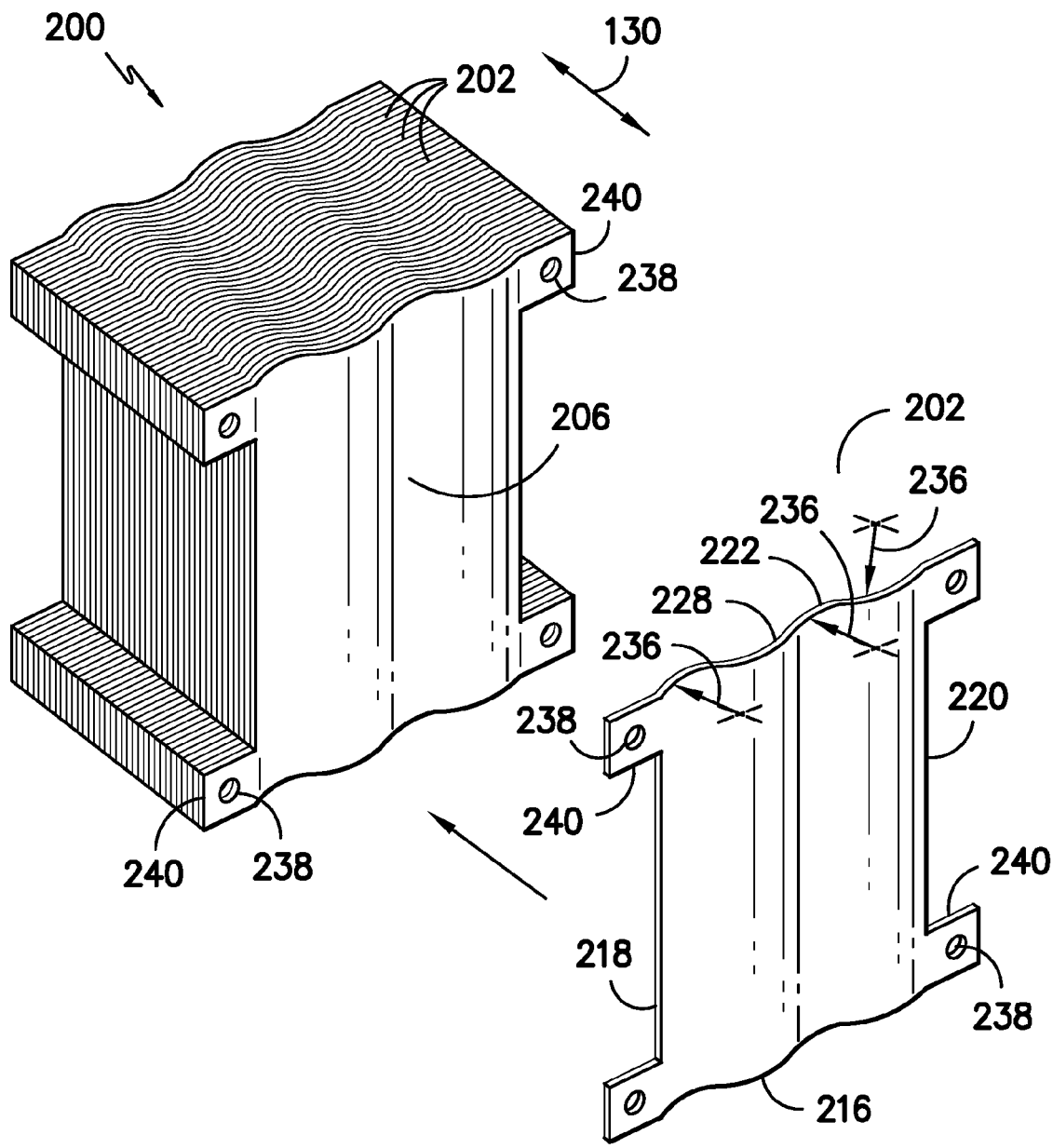
FIG. -4-

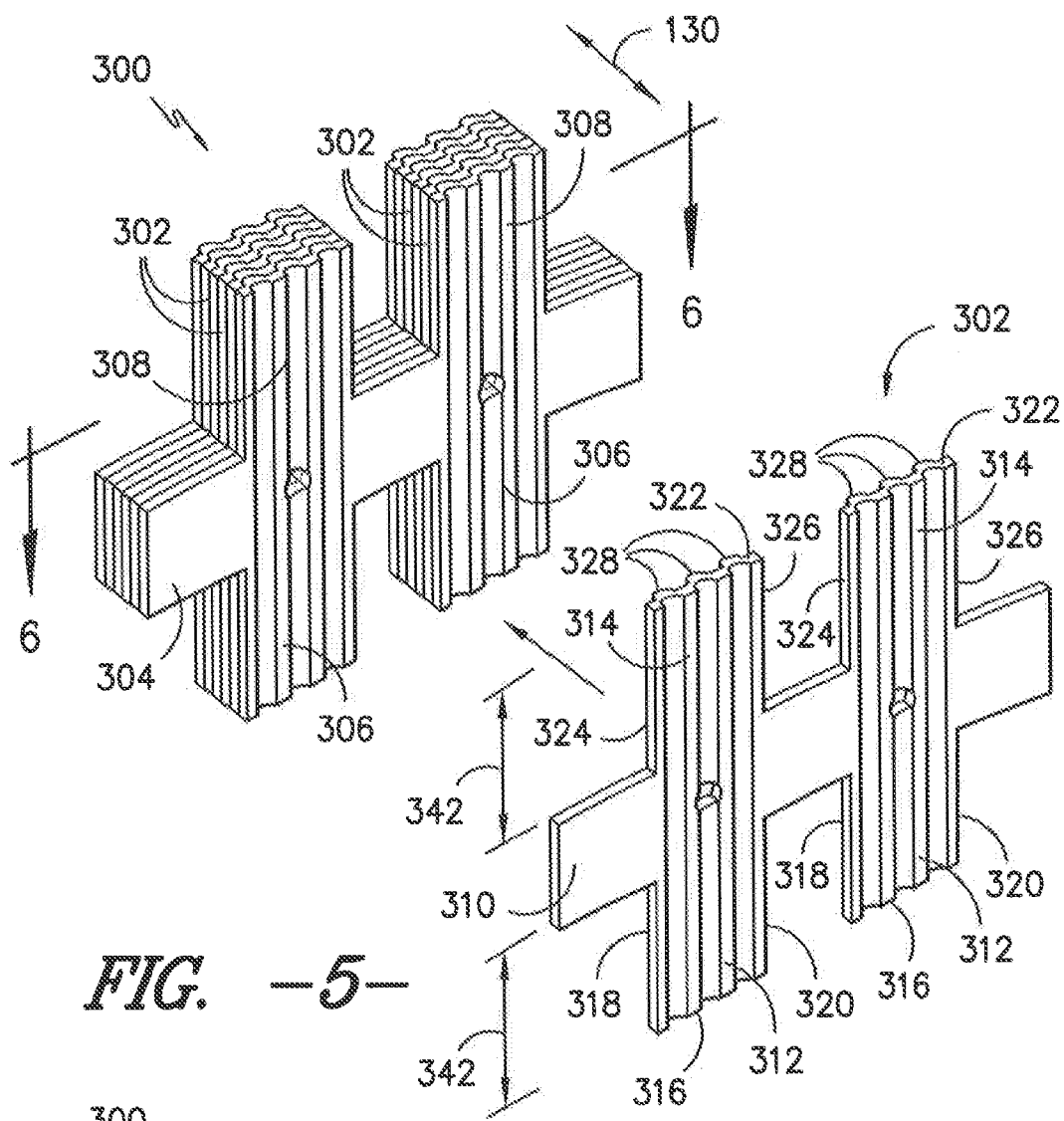
FIG. -5-
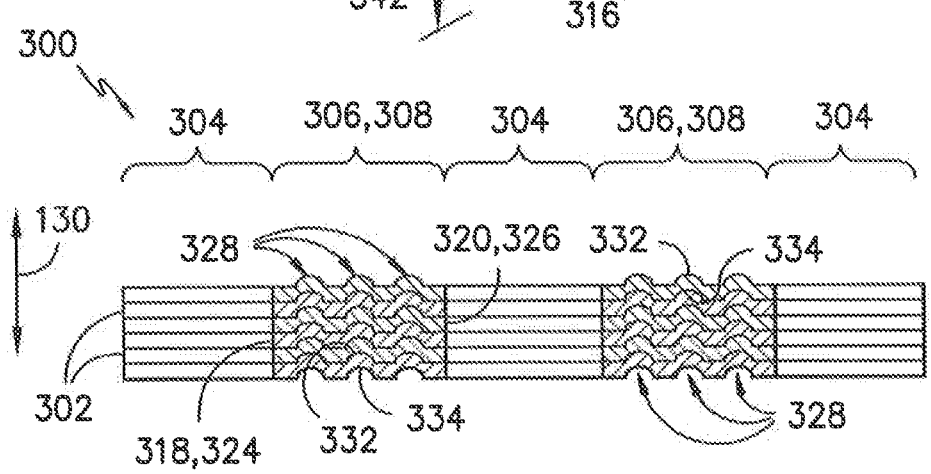
FIG. -6-

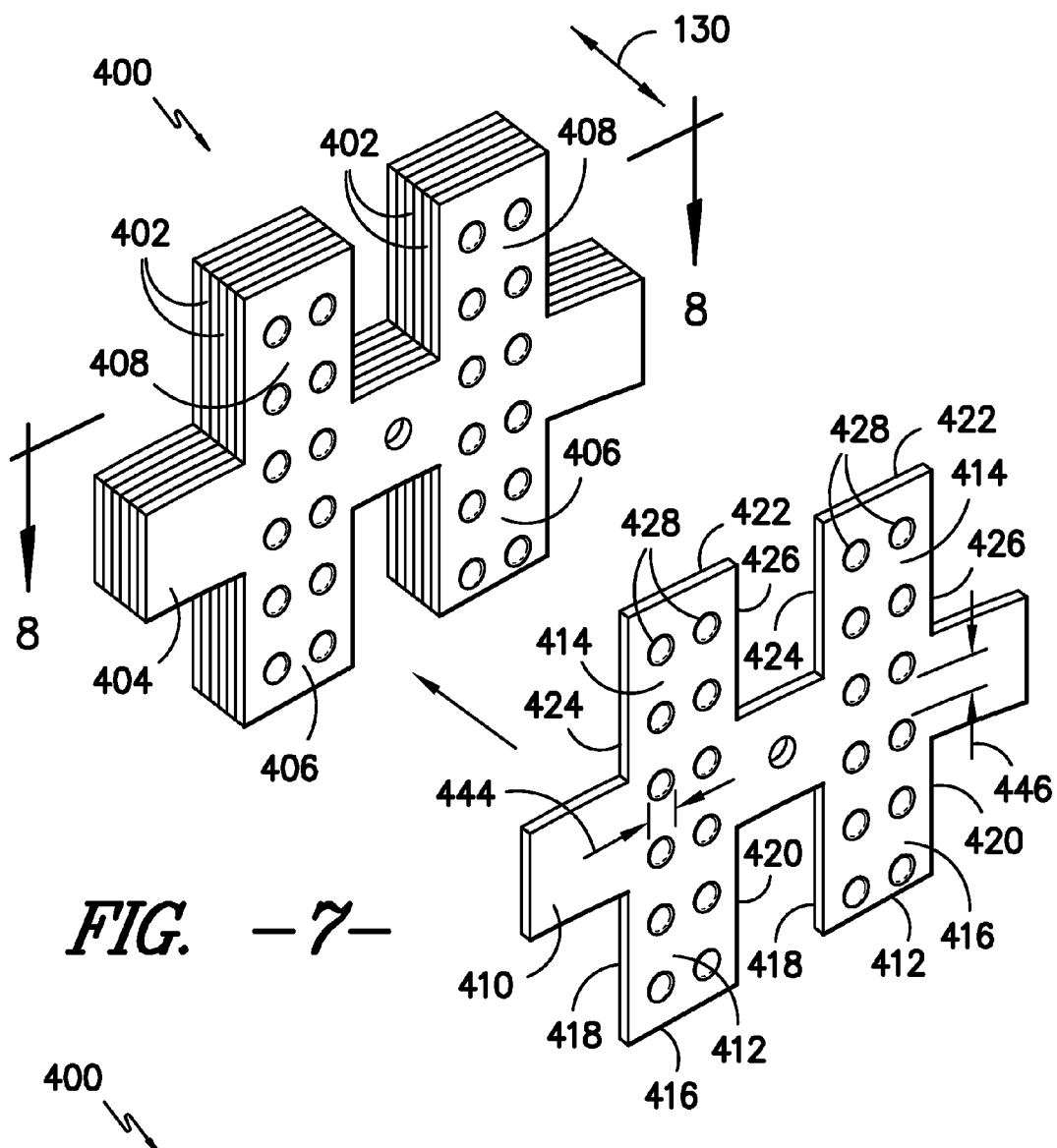
FIG. -7-
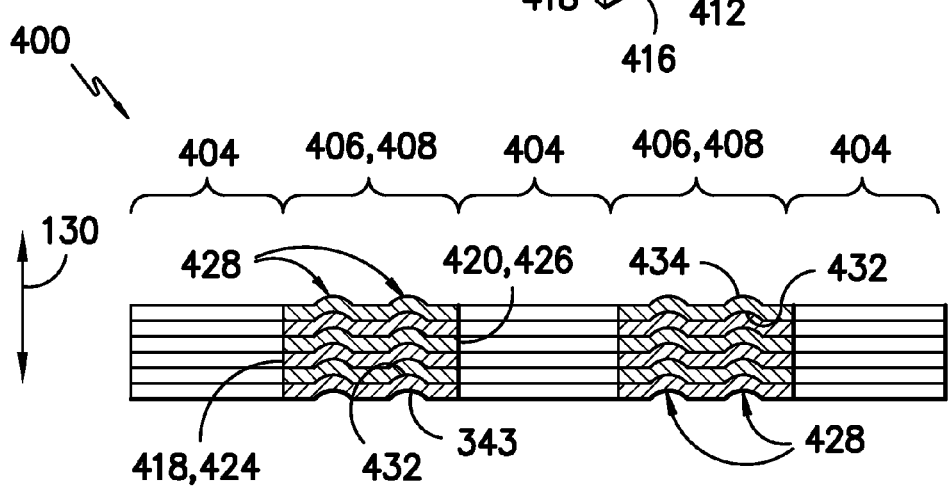
FIG. -8-

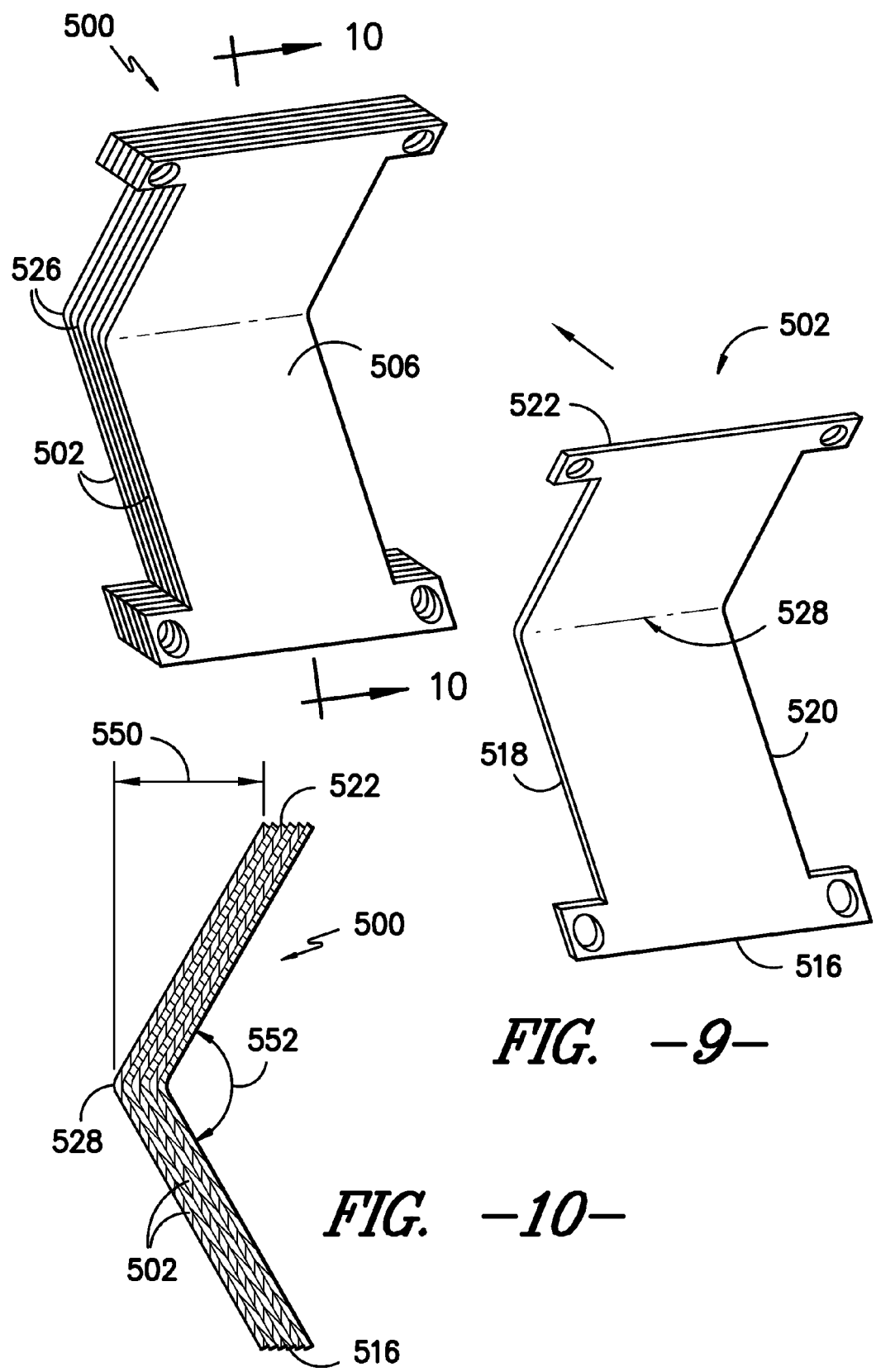
FIG. -9-
FIG. -10-

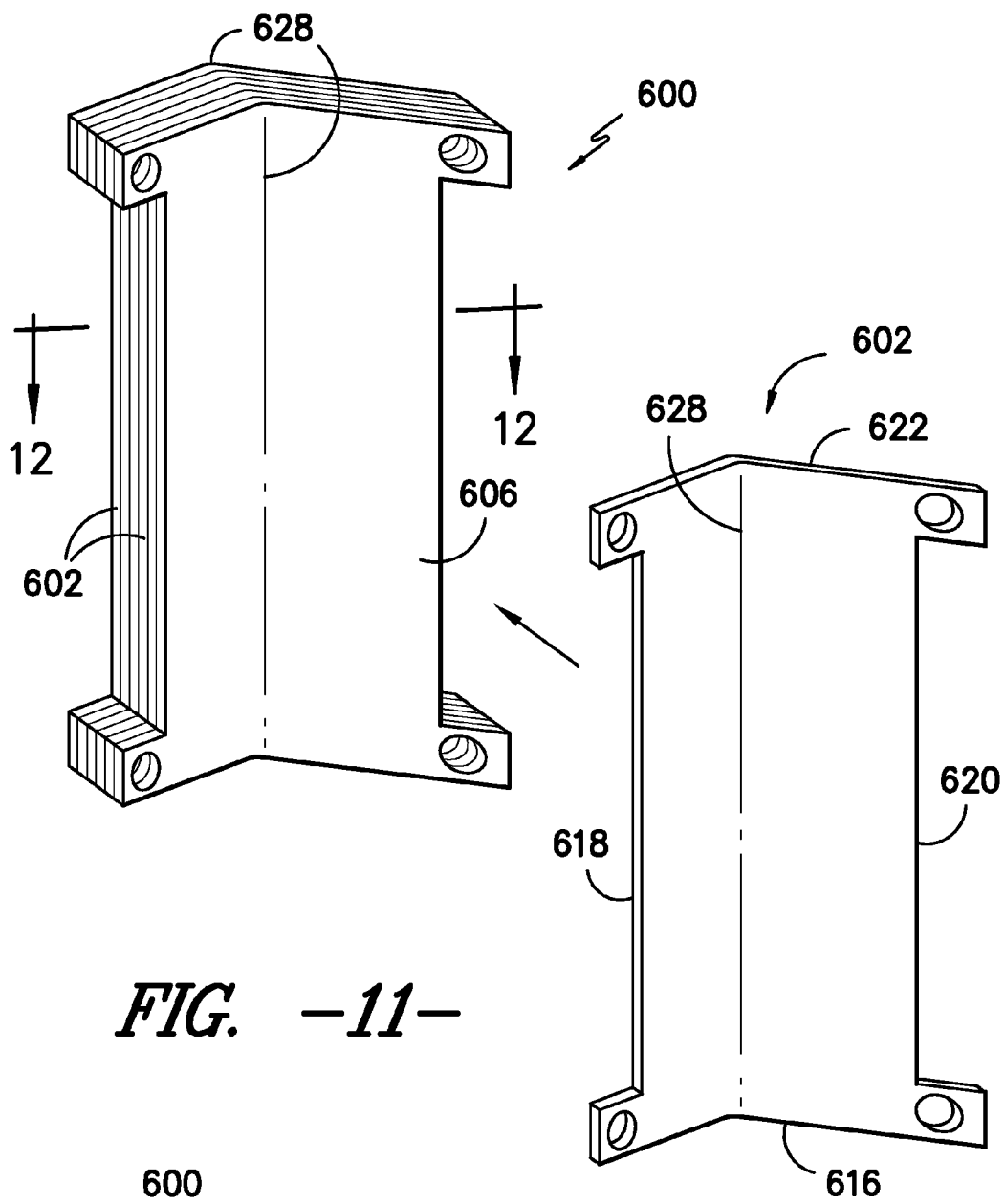
FIG. -11-
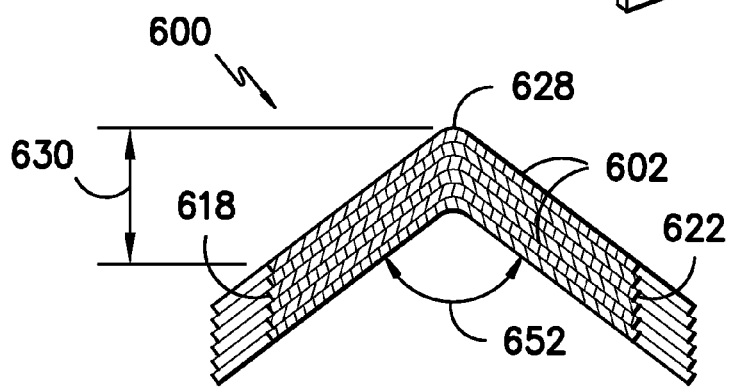
FIG. -12-

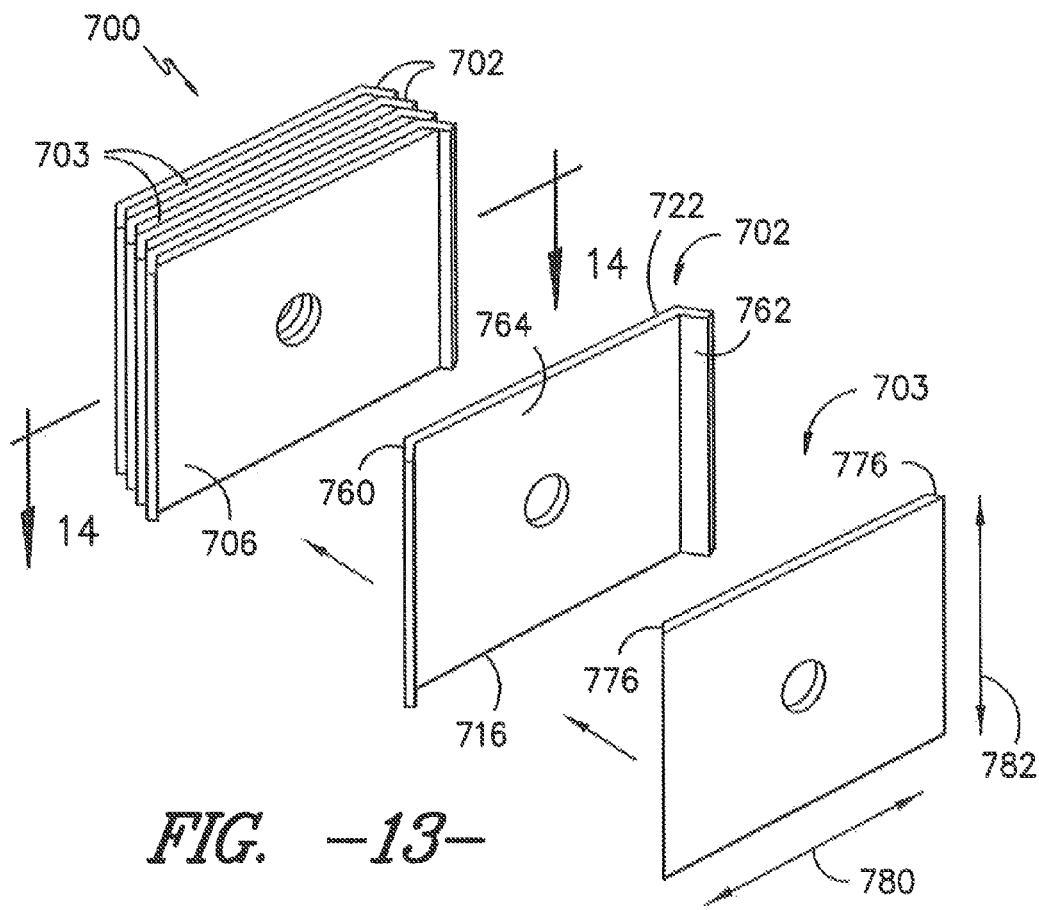
FIG. -13-
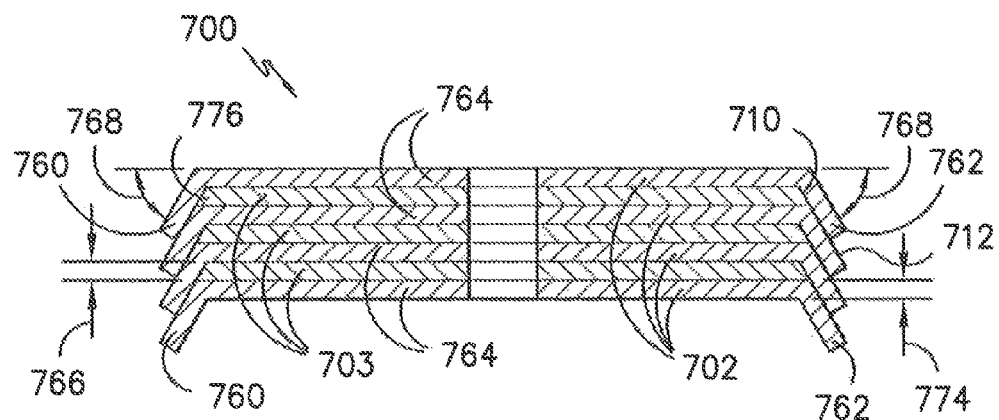
FIG. -14-

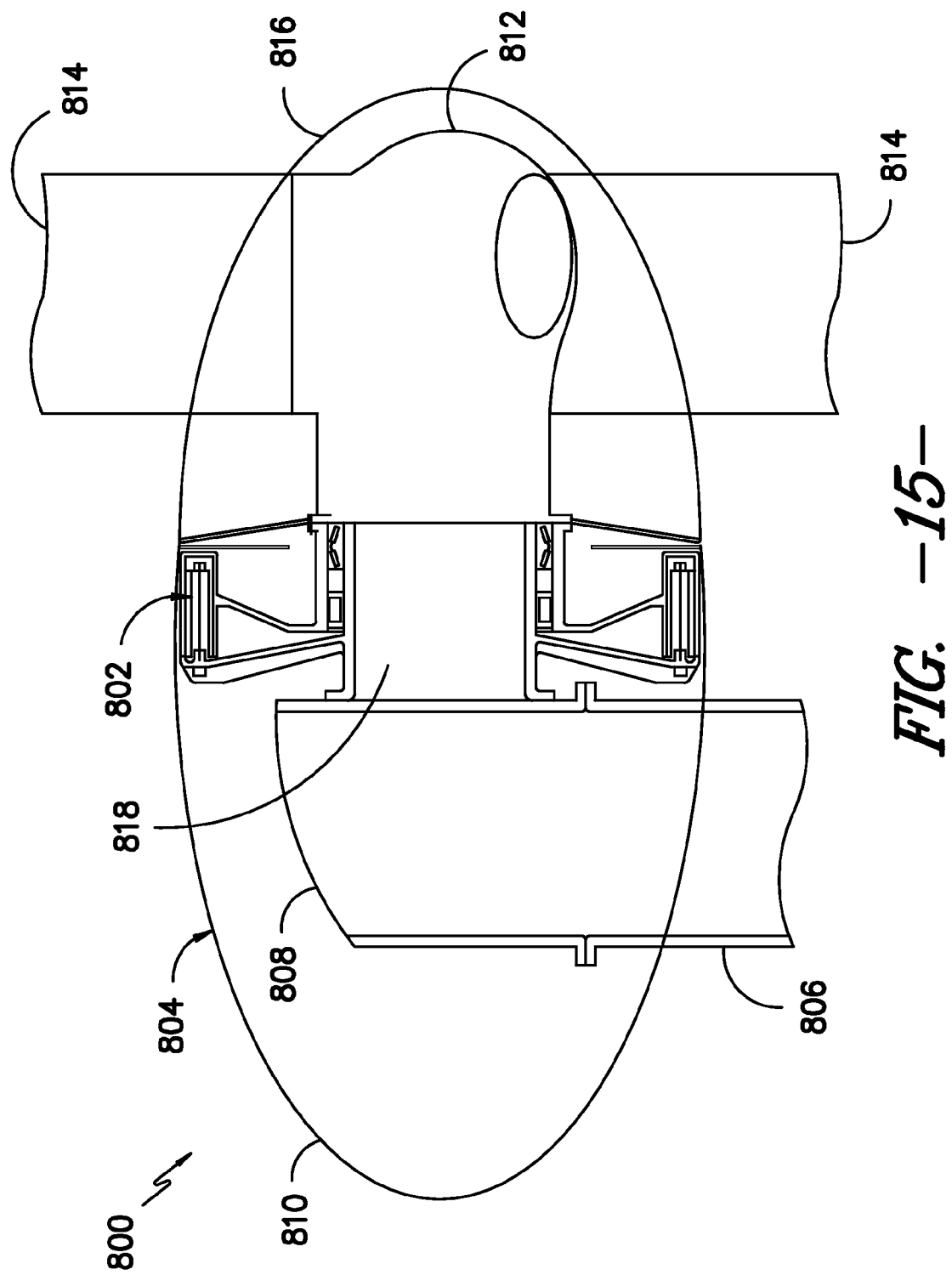
FIG. -15-

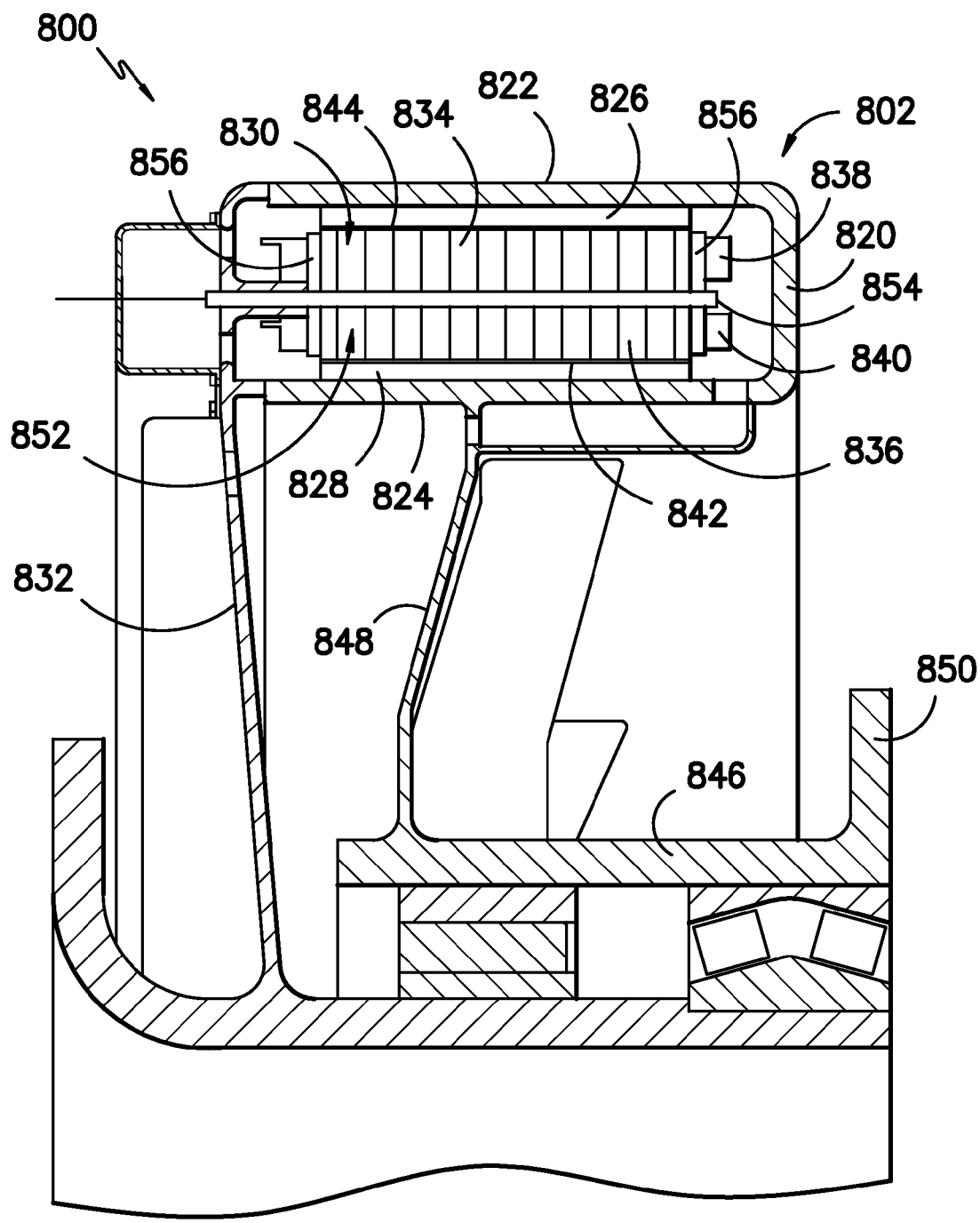
FIG. −16−

LAMINATION STACK FOR AN ELECTRICAL MACHINE STATOR

FIELD OF THE INVENTION

The present subject matter relates generally to electrical machines and, more particularly, to a lamination stack for an electrical machine stator that includes a plurality of laminations configured to increase the torque and/or shear carrying capability of the lamination stack.

BACKGROUND OF THE INVENTION

An electrical machine, such as a generator or motor, generally includes a stator and a rotor configured to convert mechanical power to electrical power or vice versa. The stator typically includes a plurality of stator teeth configured to receive coils or windings wrapped around the outer perimeter thereof. The rotor may generally be configured to be rotated such that one or more magnets attached to and/or forming part of the rotor rotate relative to the fixed windings. The relative rotation between the magnet(s) and the windings creates a rotating magnetic field, thereby inducing an electromotive force within the stator.

As is generally understood, the stator of an electrical machine is typically formed from a plurality of laminations of a material having good electromagnetic properties (e.g., silicon steel). The laminations are stacked axially together to form the stator and may often be bolted together. Typically, each lamination is configured as a flat, planar sheet. Thus, when the laminations are stacked together, the amount of torque and/or shear that can be transferred through the lamination stack is limited. Specifically, during operation of an electrical machine, a significant amount of torque and/or shear is transmitted between the rotor and stator. However, due to the flat or planar configuration of conventional laminations, such laminations often slide or move relative to one another when torque and/or shear is applied through the stator. This relative sliding can impact the electromagnetic performance of the electrical machine and can also result in damage to the stator.

Accordingly, a lamination stack with improved structural stiffness that allows for an increased amount of torque and/or shear to be transferred through the stack would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses an electrical machine stator. The stator may generally include a stack of laminations configured to be assembled together so as to define at least one stator tooth. The stack of laminations may include a plurality of nesting laminations and a plurality of shim laminations. Each nesting lamination may include a first edge section, a second edge section and a middle section extending between the first and second edge sections. At least one of the first edge section and the second edge section of each nesting lamination may be configured to be engaged against at least one of the first edge section and the second edge section of an adjacent nesting lamination when the stack of laminations is assembled together. Additionally, at least one shim lamination may be disposed between each pair of adjacent nesting laminations.

In another aspect, the present subject matter discloses a generator for a wind turbine. The generator may generally include a stack of laminations configured to be assembled together so as to define at least one stator tooth. The stack of laminations may include a plurality of nesting laminations and a plurality of shim laminations. Each nesting lamination may include a first edge section, a second edge section and a middle section extending between the first and second edge sections. At least one of the first edge section and the second edge section of each nesting lamination may be configured to be engaged against at least one of the first edge section and the second edge section of an adjacent nesting lamination when the stack of laminations is assembled together. Additionally, at least one shim lamination may be disposed between each pair of adjacent nesting laminations.

In a further aspect, the present subject matter discloses a wind turbine including a tower and a nacelle mounted on top of the tower. The wind turbine may also include a rotor hub coupled to the nacelle. The rotor hub may include a plurality of rotor blades extending therefrom. Additionally the wind turbine may include a generator housed within the nacelle. The generator may generally include a stack of laminations configured to be assembled together so as to define at least one stator tooth. The stack of laminations may include a plurality of nesting laminations and a plurality of shim laminations. Each nesting lamination may include a first edge section, a second edge section and a middle section extending between the first and second edge sections. At least one of the first edge section and the second edge section of each nesting lamination may be configured to be engaged against at least one of the first edge section and the second edge section of an adjacent nesting lamination when the stack of laminations is assembled together. Additionally, at least one shim lamination may be disposed between each pair of adjacent nesting laminations.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates an axial, front view of one embodiment of an electrical machine;

FIG. 2 illustrates a perspective view of one embodiment of a lamination stack having a plurality of laminations that may be stacked axially or otherwise assembled together to form at least a portion of an electrical machine stator, particularly illustrating each lamination defining a curved profile configured to nest together with the curved profile of an adjacent lamination;

FIG. 3 illustrates a cross-sectional view of the lamination stack shown in FIG. 2 taken along line 3-3, particularly illustrating adjacent, nesting laminations of the lamination stack;

FIG. 4 illustrates a perspective view of another embodiment of a lamination stack having a plurality of laminations that may be stacked axially or otherwise assembled together to form at least a portion of an electrical machine stator, particularly illustrating each lamination defining a curved profile configured to nest together with the curved profile of an adjacent lamination;

FIG. 5 illustrates a perspective view of a further embodiment of a lamination stack having a plurality of laminations that may be stacked axially or otherwise assembled together to form at least a portion of an electrical machine stator, particularly illustrating each lamination defining one or more channels configured to nest together with corresponding channels of an adjacent lamination;

FIG. 6 illustrates a cross-sectional view of the lamination stack shown in FIG. 5 taken along line 6-6, particularly illustrating adjacent, nesting laminations of the lamination stack;

FIG. 7 illustrates a perspective view of a yet another embodiment of a lamination stack having a plurality of laminations that may be stacked axially or otherwise assembled together to form at least a portion of an electrical machine stator, particularly illustrating each lamination defining one or more dimples configured to nest together with corresponding dimples of an adjacent lamination;

FIG. 8 illustrates a cross-sectional view of the lamination stack shown in FIG. 7 taken along line 8-8, particularly illustrating adjacent, nesting laminations of the lamination stack;

FIG. 9 illustrates a perspective view of a further embodiment of a lamination stack having a plurality of laminations that may be stacked axially or otherwise assembled together to form at least a portion of an electrical machine stator, particularly illustrating each lamination defining an axially projecting bend configured to nest together with a corresponding bend of an adjacent lamination;

FIG. 10 illustrates a cross-sectional view of the lamination stack shown in FIG. 9 taken along line 10-10, particularly illustrating adjacent, nesting laminations of the lamination stack;

FIG. 11 illustrates a perspective view of another embodiment of a lamination stack having a plurality of laminations that may be stacked axially or otherwise assembled together to form at least a portion of an electrical machine stator, particularly illustrating each lamination defining an axially projecting bend configured to nest together with a corresponding bend of an adjacent lamination;

FIG. 12 illustrates a cross-sectional view of the lamination stack shown in FIG. 11 taken along line 12-12, particularly illustrating adjacent, nesting laminations of the lamination stack;

FIG. 13 illustrates a perspective view of an even further embodiment of a lamination stack having a plurality of nesting laminations and a plurality of shim laminations that may be stacked axially or otherwise assembled together to form at least a portion of an electrical machine stator;

FIG. 14 illustrates a cross-sectional view of the lamination stack shown in FIG. 13 taken along line 14-14, particularly illustrating adjacent laminations of the lamination stack;

FIG. 15 illustrates a partial, cross-sectional view of one embodiment of a wind turbine having a generator installed therein; and FIG. 16 illustrates an enlarged, cross-sectional view of a portion of the wind turbine shown in FIG. 15, particularly illustrating various components of the generator.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present subject matter is generally directed to a stator for an electrical machine, such as a generator. In particular, the present subject matter is directed to a plurality of laminations having nesting features configured such that the nesting features of adjacent laminations are engaged against one another when the laminations are stacked axially together to form the stator. By designing the laminations to include such nesting features, the torque and/or shear carrying capability of the lamination stack may be significantly increased. For example, the nesting features of the laminations may be designed so that adjacent laminations are radially and/or circumferentially engaged with one another, thereby increasing the radial and/or circumferential stiffness of the lamination stack and increasing the amount of torque and/or shear that can be transferred through the lamination stack.

In several embodiments, it should be appreciated the present subject matter may be advantageously utilized with compact generators having laminations that must be capable of resisting large, electromagnetic or structural loads. For example, as will be described below, the disclosed laminations may be advantageously used to form the stator of a wind turbine generator, such as a yokeless wind turbine generator (e.g., a double-sided wind turbine generator) that does not have a separate frame providing structural support to the laminations. Specifically, the laminations of such generators must be capable of resisting substantial electro-magnetic and structural loads (e.g., wind-induced loads). Thus, the nesting features of the disclosed laminations may permit the overall stiffness of the lamination stack to be increased, thereby improving the ability of the laminations to carry such loads. However, it should be appreciated that application of the present subject matter need not be limited to compact generators or generators for wind turbines. Rather, the disclosed laminations may be utilized with electrical machines in any suitable application to increase the torque and/or shear carrying capability of the lamination stack.

Referring now to the drawings, FIG. 1 illustrates an axial, front view of one embodiment of an electrical machine 10. As shown, the electrical machine 10 is configured as a double-sided, permanent magnet (PM) generator and, thus, includes a rotor 12 having an outer rotor portion 14 and an inner rotor portion 16. A plurality of outer magnets 18 may extend radially inwardly from the outer rotor portion 14. Similarly, a plurality of inner magnets 20 may extend radially outwardly from the inner rotor portion 16. As is generally understood, the rotor 12 may be coupled to a rotational input source (not shown) configured to rotate the inner and outer rotor portions 14, 16. For example, in embodiments in which the electrical machine 10 is configured as a generator for a wind turbine, the rotor 12 may be coupled to the rotor hub and, thus, the rotor blades of the wind turbine via a rotor shaft.

By increasing the torque and/or shear carrying capability of a lamination stack, numerous advantages may be provided to an electrical machine stator. For example, an increased torque and/or shear carrying capability may reduce the amount of radial and circumferential (or tangential) deflection of the lamination stack due to electromagnetic loads. Moreover, an increased torque and/or shear carrying capability may also prevent adjacent laminations from slipping and/ or sliding relative to one another when the lamination stack is subject to electromagnetic loads. Specifically, the disclosed nesting features may serve to radially and/or circumferentially lock adjacent laminations together, thereby reducing the need to support all the electromagnetic loads within the lamination stack by friction only. As a result, the axial bolts used to preload the laminations in order to hold the stack together in compression may be reduced in size and/or strength, which may, in turn, reduce the overall cost of the lamination stack and/or allow for a reduction in the overall stack size.

Additionally, the electrical machine 10 may include a stator 22 fixed in position relative to the rotor 12. For example, the stator 22 may be coupled to a stationary frame (not shown) of the electrical machine 10. As shown in the illustrated embodiment, the stator 22 is configured as a double-sided stator and includes a plurality of teeth 24, 26 extending radially inwardly and radially outwardly from an annular, bridge portion 28. Specifically, a plurality of outer teeth 24 may extend radially outwardly from the bridge portion 28, with each outer tooth 24 being configured to receive an outer stator coil or winding 30, such as by wrapping each outer stator winding 30 around each outer tooth 24. Similarly, a plurality of inner teeth 26 may extend radially inwardly from the bridge portion 28, with each inner tooth 26 being configured to receive an inner stator coil or winding 32, such as by wrapping each inner stator winding 32 around each inner tooth 26. For purposes of illustrating the stator teeth 30, 32, the outer and inner stator windings 30, 32 are only shown as being received on the inner and outer stator teeth 30, 32 around a portion of the circumference of the stator 22.

The stator 22 may generally be disposed concentrically between the inner and outer rotor portions 14, 16. As such, at least two concentric air gaps 34, 36 may be defined between the stator 22 and the inner and outer rotor portions 14, 16. For example, an inner air gap 34 may be defined between the inner rotor portion 16 and an inner edge 38 of each inner tooth 26 and an outer air gap 36 may be defined between the outer rotor portion 14 and an outer edge 40 of each outer tooth 24.

Additionally, as shown in the illustrated embodiment, the stator 22 is configured as a yokeless stator. Thus, in several embodiments, an axial end (not shown) of the stator 22 may be mounted to a stationary frame of the electrical machine 10. For example, the stator 22 may be mounted to the stationary frame using one or more bolts 42 extending axially through the bridge portion 28 of the stator 22. Moreover, as will be described below, the bridge portion 22, the inner teeth 26 and the outer teeth 24 of the stator 22 may generally be formed from a lamination stack comprising a plurality of laminations stacked axially together. Thus, in addition to mounting to the stator 22 to the stationary frame, the bolts 42 may also provide uniform compression of the lamination stack in the axial direction.

During operation of the electrical machine 10, the rotor 12 is rotated such that the magnets 18, 20 extending from the outer and inner rotor portions 14, 16 rotate relative to the stator windings 30, 32 received on the outer and inner stator teeth 24, 26. As is generally understood, such rotation of the rotor 12 may create a rotating magnetic field which induces an electromotive force within the stator 22.

It should be appreciated that the electrical machine 10 shown in FIG. 1 is simply provided for illustrative purposes to place the present subject matter within an exemplary field of use. Thus, the electrical machine 10 need not be configured as a double-sided, PM generator, but, rather, may generally be configured as any suitable electrical machine. Specifically, in alternative embodiments, the electrical machine 10 may comprise any single-sided electrical machine, any double-sided electrical machine, any non-PM electrical machine (e.g., wound field synchronous machines and switched or synchronous reluctance machines) and any other electrical machine known in the art.

Similarly, it should be appreciated that the disclosed stator 22 need not be limited to the double-sided, yokeless stator shown in FIG. 1. Rather, the configuration of the stator 22 may generally vary depending on the configuration of the electrical machine 10. For example, in embodiments in which the electrical machine 10 is configured as a single-sided electrical machine, the stator 22 may be configured as a single-sided stator and, thus, may only comprise stator teeth 24, 26 extending radially inwardly or radially outwardly from the annular bridge portion 28. Additionally, in such embodiments, the stator 22 may include a conventional yoke (not shown) configured to carry the circumferential component of the magnetic flux linking the stator teeth 24, 26. For instance, in one embodiment, the annular bridge portion 28 of the stator 22 may be configured as the stator yoke. In other embodiments, the stator 22 need not be formed from a single, annular shaped lamination stack, but may be formed from a plurality of separate lamination stacks. For instance, in a particular embodiment, the stator 22 may comprise a plurality of separate tooth modules mounted in an annular array about a stator frame or plate. Suitable examples of stators formed from separate lamination stacks are provided in U.S. Pat. No. 7,692,357 (Qu et al) and U.S. Pat. No. 7,839,049 (Jansen et al), assigned to the General Electric Company.

Referring now to FIGS. 2 and 3, there is illustrated one embodiment of a lamination stack 100 having a plurality of laminations 102 that may be stacked axially or otherwise assembled together to form at least a portion of an electrical machine stator 22 (FIG. 1). In particular, FIG. 2 illustrates a partial, perspective view of the lamination stack 100. Additionally, FIG. 3 illustrates a cross-sectional view of the lamination stack 100 shown in FIG. 2 taken along line 3-3, particularly illustrating adjacent, nesting laminations 102 of the lamination stack 100.

As shown, each lamination 102 is generally configured such that, when the laminations 102 are assembled together into the lamination stack 100, a doubled-sided stator is formed. Thus, similar to that described above, the lamination stack 102 may generally include an annular bridge portion 104 (only a portion of which is shown) and a plurality of inner and outer stator teeth 106, 108 extending radially inwardly and radially outwardly from the bridge portion 104, respectively, (four of which are shown). As is generally understood, the bride portion 104 and teeth 106, 108 of the lamination stack 10 may be partially defined/formed by corresponding features of each lamination 102. For instance, as shown in FIG. 2, each individual lamination 102 may include an annular connecting portion 110 (only a portion of which is shown) corresponding to the bride portion 104 and a plurality of inner and outer projections 112, 114 corresponding to the inner and outer stator teeth 106, 108. In general, each inner projection 112 may include an inner edge 116 and first and second side edges 118, 120 extending radially between the inner edge 116 and the connecting portion 110 so as to define an axial portion of each inner stator tooth 106. Similarly, each outer projection 114 may include an outer edge 122 and first and second side edges 124, 126 extending radially between the outer edge 122 and the connecting portion 110 so as to define an axial portion of each outer stator tooth 108.

Additionally, in accordance with aspects of the present subject matter, each lamination 102 may include a nesting feature 128 defined and/or extending between its first and second side edges 118, 120, 124, 126. In general, the nesting feature 128 of each lamination 102 may be configured to be engaged with the nesting features 128 of adjacent laminations 102 when the laminations 102 are assembled axially to form the lamination stack 100. As such, adjacent laminations 102 of the lamination stack 100 may be radially and/or circumferentially engaged with one another, thereby increasing the radial and/or circumferential stiffness of the lamination stack 100 and, thus, increasing the torque and/or shear carrying capability of the lamination stack 100.

As shown in FIGS. 2 and 3, in several embodiments, the nesting feature 128 may be configured as a curved profile 128 extending between the first and second side edges 118, 120, 124, 126 of each lamination 102. Specifically, at least a portion of each lamination 102 may be curved or arced such that the lamination 102 extends or projects outwardly in the axial direction (indicated by line 130 in FIGS. 2 and 3) between its first and second side edges 118, 120, 124, 126. For example, as shown in the illustrated embodiment, the inner and outer projections 112, 114, as well as the sections of the connecting portion 110 extending radially directly between the inner and outer projections 112, 114, may be curved or arced outwardly so as to define a continuous curved profile 128 between the first and second side edges 118, 120, 124, 126 that extends radially between the inner and outer edges 116, 122 of each lamination 102. In such an embodiment, as particularly shown in FIG. 3, the sections of the connecting portion 110 not extending radially directly between the inner and outer projections 112, 114 may be configured to define a generally flat or planar profile. However, it should be appreciated that, in other embodiments, the sections of the connecting portion 110 not extending directly between the inner and outer projections 112, 114 may also be arced or curved (e.g., by being curved outwardly in the opposite axial direction 130 as the curved profile 128 defined in the inner and outer projections 112, 114) so that each lamination 102 defines a continuous curved profile around its entire circumference.

Regardless, each lamination 102 may be designed such that it nests together with and/or is otherwise radially and/or circumferentially engaged against an adjacent lamination 102 when the lamination stack 100 is assembled. For instance, as shown in FIG. 3, the curved profile 128 of each lamination 102 may be configured to mate with the curved profile 128 of adjacent laminations 102, with each curved profile 128 defining an axial projection 132 on one side of the lamination 102 and an axial recess 134 on the opposing side of the lamination 102. As such, the axial projection 132 of each lamination 102 may be configured to extend axially into the axial recess 134 of an adjacent lamination 102 when the laminations 102 are stacked axially together. Accordingly, adjacent laminations 102 of the lamination stack 100 may be radially and/or circumferentially engaged against one another, thereby increasing the radial and/or circumferential stiffness of the lamination stack 100.

As particularly shown in FIG. 3, in one embodiment, the curved profile 128 of each lamination 102 may define a constant radius of curvature 136 between the first and second side edges 118, 120, 124, 126. In other embodiments, the radius of curvature 136 may vary between the first and second side edges 118, 120, 124, 126. For instance, as will be described below with reference to FIG. 4, the radius of curvature 136 may vary continuously between the first and second side edges 118, 120, 124, 126 such that the curved profile 128 of each lamination 102 is wavy or undulating.

It should be appreciated that, as shown in the illustrated embodiment, the center of the curved profile 128 of each lamination 102 is generally oriented in the radial direction. As such, the adjacent laminations 102 may generally be circumferentially engaged with one another. However, in alternative embodiments, the center of the curved profile 128 of each lamination 102 may be oriented in the circumferential direction (so that adjacent laminations 102 may generally be radially engaged with one another) and/or may be angled relative to the circumferential and radial directions (so that adjacent laminations 102 may generally be both circumferentially and radially engaged with one another).

Moreover, as shown in FIG. 2, a plurality of bolt holes 138 may be defined through each lamination 102. For example, in the illustrated embodiment, the bolt holes 138 are defined through the connecting portion 110 at locations between each inner and outer projection 112, 114. However, in alternative embodiments, the bolt holes 138 may be defined through each lamination 102 at any other suitable location. As is generally understood, the bolt holes 138 may be configured to receive an axially extending bolt or other suitable fastening mechanism (not shown) for mounting the lamination stack 100 to a stationary frame (not shown) of the electrical machine 10.

It should be appreciated that, although the laminations 102 shown in FIGS. 2 and 3 are configured to be assembled together to form a double-sided stator, the disclosed nesting feature 128 may generally be utilized in laminations configured to be assembled together to form any other suitable stator configuration, such as a single-sided stator or a stator comprising a plurality of separate lamination stacks. For instance, FIG. 4 illustrates a perspective view of a plurality of laminations 202 that may be stacked axially or otherwise assembled together to form one of a plurality separate lamination stacks 200 of an electrical machine stator 22 (FIG. 1).

As shown in FIG. 4, the lamination stack 200 may generally comprise a stand-alone tooth module of an electrical machine stator 22 (FIG. 1) and, thus, may define a single stator tooth 206 configured to receive a suitable stator winding 30, 32 (FIG. 1). Thus, each lamination 202 may generally include an inner edge 216, an outer edge 222 and first and second side edges 218, 220 extending radially between the inner and outer edges 216, 218, with the stator tooth 206 of the lamination stack 200 being partially defined between the first and second side edges 218, 220 of each lamination 202. Additionally, similar to the embodiment described above with reference to FIGS. 2 and 3, the laminations 102 may include corresponding nesting features 228 (i.e., curved profiles 228) defined and/or extending between their first and second side edges 218, 220 so that the curved profile 228 of each lamination 202 projects axially into and/or is axially received by the curved profile 228 of adjacent laminations 202. As such, adjacent laminations 202 may be radially and/or circumferentially engaged with one another, thereby increasing the radial and/or circumferential stiffness of the lamination stack 202.

However, unlike the curved profiles 128 described above, the radius of curvature 236 of each lamination 202 generally varies between the first and second side edges 218, 220. Specifically, as shown, the radius of curvature 236 may be varied such that a portion of each lamination 202 projects and/or extends in both the positive and negative axial directions (indicated by the opposed arrows of line 130) between the first and second side edges 218, 220. As a result, each lamination may generally define a wavy or undulating, curved profile 228 between its side edges 218, 220.

Additionally, as shown in FIG. 4, one or more bolt holes 238 may be defined through each lamination 202 for receiving a bolt or other suitable fastening mechanism (not shown). For example, in the illustrated embodiment, each lamination 202 includes four bolt holes 238, with each bolt hole 238 being defined thorough a side tab 240 projecting outwardly from the first or second side edge 218, 220 at and/or adjacent to the outer or inner edge 216, 222 of each lamination 202. However, in other embodiments, any other suitable number of bolt holes 238 may be defined through each lamination 202 at any other suitable location.

Referring now to FIGS. 5 and 6, there is illustrated another embodiment of a lamination stack 300 having a plurality of laminations 302 that may be stacked axially or otherwise assembled together to form at least a portion of an electrical machine stator 22 (FIG. 1). In particular, FIG. 5 illustrates a partial, perspective view of the lamination stack 300. Additionally, FIG. 6 illustrates a cross-sectional view of the lamination stack 300 shown in FIG. 5 taken along line 6-6, particularly illustrating adjacent, nesting laminations 302 of the lamination stack 300.

In general, the lamination stack 300 may be configured the same as or similar to the lamination stack 100 described above with reference to FIGS. 2 and 3. For example the lamination stack 300 may generally include an annular bridge portion 304 (only a portion of which is shown) and a plurality of inner and outer stator teeth 306, 308 extending radially inwardly and radially outwardly from the bridge portion 304, respectively, (four of which are shown), with such features of the lamination stack 300 being partially defined or formed by corresponding features of each lamination 302. Specifically, as shown in the illustrated embodiment, each individual lamination 302 may include an annular connecting portion 310 (only a portion of which is shown) corresponding to the bride portion 304 and a plurality of inner and outer projections 312, 314 corresponding to the inner and outer stator teeth 306, 308. In general, each inner projection 312 may include an inner edge 316 and first and second side edges 318, 320 extending radially between the inner edge 316 and the connecting portion 210 so as to define an axial portion of each inner stator tooth 306. Similarly, each outer projection 314 may include an outer edge 322 and first and second side edges 324, 326 extending radially between the outer edge 320 and the connecting portion 310 so as to define an axial portion of each outer stator tooth 308.

Additionally, each lamination 302 may include a nesting feature 328 defined and/or extending between its first and second side edges 318, 320, 324, 326 such that adjacent laminations 320 may be engaged with one another when the laminations 302 are assembled together to form the lamination stack 300. However, unlike the nesting features 128, 228 described above (i.e., the curved profiles), the nesting feature 328 may comprise one or more channels 328 extending lengthwise at least partially between the inner and outer edges 316, 322 of each lamination 302, with each channel 328 being spaced apart from the first and second side edges 318, 320, 324, 326. For instance, in the illustrated embodiment, each lamination 302 defines three channels 328 extending between its inner and outer edges 316, 322 and being spaced apart from the first and second side edges 318, 320, 324, 326. However, in alternative embodiments, each lamination 302 may define any other suitable number of channels 328, such as less than three channels 328 or greater than three channels 328.

As shown in FIG. 5, one embodiment, the channels 328 may be configured to extend radially between the inner and outer edges 316, 322, such as by extending lengthwise substantially perpendicular to the inner and outer edges 316, 322 and/or substantially parallel to the first and second side edges 318, 320, 324, 326. However, in alternative embodiments, the channels 328 may extend lengthwise at an angle relative to the inner and outer edges 316, 322 and/or the first and second side edges 318, 320, 324, 326 and/or the channels 328 may extend circumferentially between the first and second side edges 318, 320, 324, 326, such as by extending lengthwise substantially perpendicular to the first and second side edges 318, 320, 324, 326 and/or substantially parallel to the inner and outer edges 316, 322. Additionally, as shown in the illustrated embodiment, the channels 328 may be configured to extend along an entire radial height 342 of each inner and outer projection 312, 314 (e.g., the entire radial height 342 of each stator tooth 306, 308), such as by extending radially along the distance defined between the inner and outer edges 316, 322 of each lamination 302. In other embodiments, the channels 328 may only be configured to extend along a portion of the radial height 342 of each inner and outer projection 312, 314.

As particularly shown in FIG. 6, each channel 328 formed may be configured to project or extend outwardly in the axial direction (indicated by line 130). As such, each channel 328 may be designed so that it nests together with or is otherwise engaged against a corresponding channel 328 of an adjacent lamination 302 when the lamination stack 302 is assembled. For instance, as shown in the illustrated embodiment, each channel 328 may define an axial projection 332 on one side of each lamination 302 and an axial recess 334 in the opposing side of the lamination 302. As such, the axial projection 332 of each channel 328 may be configured to extend axially into the axial recess 334 of an adjacent channel 328 when the laminations 302 are stacked axially together. Accordingly, adjacent laminations 302 of the lamination stack 300 may be radially and/or circumferentially engaged against one another, thereby increasing the radial and/or circumferential stiffness of the lamination stack 300.

It should be appreciated that, although the laminations 302 shown in FIGS. 5 and 6 are configured to be assembled together to form a double-sided stator, the disclosed nesting features 328 (e.g., the channels 328) may generally be utilized in laminations configured to be assembled together to form any other suitable stator configuration, such as a single-sided stator or a stator comprising a plurality of separate lamination stacks. For instance, referring back to FIG. 4, as an alternative to the curved profile, one or more channels 328 may be formed in each lamination 202, such as by forming channels 328 in each lamination 202 that extend radially between the lamination's inner and outer edges 216, 222.

Referring now to FIGS. 7 and 8, there is illustrated another embodiment of a lamination stack 400 having a plurality of laminations 402 that may be stacked axially or otherwise assembled together to form at least a portion of an electrical machine stator 22 (FIG. 1). In particular, FIG. 7 illustrates a partial, perspective view of the lamination stack 400. Additionally, FIG. 8 illustrates a cross-sectional view of the lamination stack 400 shown in FIG. 7 taken along line 8-8, particularly illustrating adjacent, nesting laminations 402 of the lamination stack 400.

In general, the lamination stack 400 may be configured the same as or similar to the lamination stacks 100, 300 described above with reference to FIGS. 2, 3, 5 and 6. For example the lamination stack 400 may generally include an annular bridge portion 404 (only a portion of which is shown) and a plurality of inner and outer stator teeth 406, 408 extending radially inwardly and radially outwardly from the bridge portion 404, respectively, (four of which are shown), with such features of the lamination stack 400 being partially defined or formed by corresponding features of each lamination 402. Specifically, as shown in the illustrated embodiment, each individual lamination 402 may include an annular connecting portion 410 (only a portion of which is shown) corresponding to the bride portion 404 and a plurality of inner and outer projections 412, 414 corresponding to the inner and outer stator teeth 406, 408.

In general, each inner projection 412 may include an inner edge 416 and first and second side edges 418, 420 extending radially between the inner edge 416 and the connecting portion 410 so as to define an axial portion of each inner stator tooth 406. Similarly, each outer projection 414 may include an outer edge 422 and first and second side edges 424, 426 extending radially between the outer edge 422 and the connecting portion 410 so as to define an axial portion of each outer stator tooth 408.

Additionally, each lamination 402 may include a nesting feature 428 defined and/or extending between its first and second side edges 418, 420, 424, 426 such that adjacent laminations 402 may be engaged with one another when the laminations 402 are assembled together to form the lamination stack 400. However, unlike the nesting features 128, 228, 328 described above, the nesting feature 428 may comprise one or more dimples 428 formed in each lamination 402. For instance, as shown in FIG. 7, a plurality of dimples 428 may be spaced apart between the inner and outer edges 416, 422 and the first and second side edges 418, 420, 424, 426 of each lamination 402. In several embodiments, the dimples 428 may be formed in each lamination 402 so as to define a pattern, such as by being aligned in rows or columns extending radially and/or circumferentially between the first and second side edges 418, 420, 424, 426 of each lamination 402. However, in alternative embodiments, the dimples 428 may be randomly formed in each lamination 402.

In general, each dimple 428 may be configured to project or extend outwardly in the axial direction (indicated by line 130). As such, each dimple 428 may be designed so that it nests together with or is otherwise engaged against a corresponding dimple 428 of an adjacent lamination 402 when the lamination stack 400 is assembled. For instance, as shown in the illustrated embodiment, each dimple 428 may define an axial projection 432 on one side of each lamination 402 and an axial recess 434 in the opposing side of the lamination 402. As such, the axial projection 432 of each dimple 428 may be configured to extend axially into the axial recess 334 of an adjacent dimple 428 when the laminations 402 are stacked axially together. Accordingly, adjacent laminations 402 of the lamination stack 400 may be radially and/or circumferentially engaged against one another, thereby increasing the radial and/or circumferential stiffness of the lamination stack 400.

It should be appreciated that the dimples 428 may generally be formed in each lamination 402 so as to define any suitable shape. For example, as shown in the illustrated embodiment, each dimple 428 generally defines a circular shape. However, in alternative embodiments, the dimples 428 may define any other suitable shape, such as a rectangular or a triangular shape. Moreover, each dimple 428 may generally have any suitable dimensions, such as by defining any suitable circumferential width 444 and any suitable radial height 446.

Additionally, it should be appreciated that, although the laminations 402 shown in FIGS. 7 and 8 are configured to be assembled together to form a double-sided stator, the disclosed nesting features 428 (e.g., the dimples 428) may generally be utilized in laminations configured to be assembled together to form any other suitable stator configuration, such as a single-sided stator or a stator comprising a plurality of separate lamination stacks. For instance, referring back to FIG. 4, as an alternative to the curved profile, one or more dimples 428 may be formed in each lamination 202, such as by spacing apart a plurality of dimples 428 between the first and second side edges 218, 220 of each lamination 202.

Referring now to FIGS. 9 and 10, there is illustrated yet another embodiment of a lamination stack 500 having a plurality of laminations 502 that may be stacked axially or otherwise assembled together to form at least a portion of an electrical machine stator 22 (FIG. 1). In particular, FIG. 9 illustrates a perspective view of the lamination stack 500. Additionally, FIG. 10 illustrates a cross-sectional view of the lamination stack 500 shown in FIG. 9 taken along line 10-10, particularly illustrating several adjacent, nesting laminations 502 of the lamination stack 500.

As shown, the lamination stack 500 may generally be configured the same as or similar to the lamination stack 200 described above with reference to FIG. 4. For example, the lamination stack 500 may generally comprise a stand-alone tooth module of an electrical machine stator 22 (FIG. 1) and, thus, may define a single stator tooth 506 configured to receive a suitable stator winding 30, 32 (FIG. 1). Thus, each lamination 502 may generally include an inner edge 516, an outer edge 522 and first and second side edges 518, 520 extending radially between the inner and outer edges 516, 522, with the stator tooth 506 of the lamination stack 500 being partially defined between the first and second side edges 518, 520 of each lamination 502.

In addition, each lamination 502 may include a nesting feature 528 defined between its first and second side edges 518, 520 such that adjacent laminations 502 may be engaged with one another when the laminations 502 are assembled together to form the lamination stack 500. However, unlike the nesting features 128, 228, 328, 328 described above, the nesting feature 528 may comprise an axially projecting bend 528 extending between the first and second side edges 518, 520. For example, as shown in FIG. 10, each lamination 502 may be formed so that the bend 528 is spaced axially apart from the inner and/or outer edges 516, 522, such as by being spaced apart from both edges 516, 522 by an axial distance 550. As such, the axial projecting bend 528 of each lamination 502 may be configured to be received within and/or received by the corresponding axially projecting bends 528 of adjacent laminations 502. Accordingly, adjacent laminations 502 may be radially and/or circumferentially engaged against one another, thereby increasing the radial and/or circumferential stiffness of the lamination stack 500.

It should be appreciated that the bend 528 formed in each lamination 502 may generally be configured to define any suitable angle 552. For example, as shown in FIG. 10, in one embodiment, the angle 552 may be equal to about 90 degrees. However, in other embodiments, the angle 552 may be less than 90 degrees or greater than 90 degrees. Additionally, as shown in FIG. 9, in one embodiment, the bend 528 may be defined in each lamination so as to extend substantially perpendicularly between the first and second side edges 518, 520. In other embodiments, the bend 528 may extend at any other suitable angle between the first and second side edges 518, 520.

Moreover, as shown in the illustrated embodiment, the bend 528 is defined in each lamination 502 at a location generally equidistant from the inner and outer edges 516, 522. However, in alternative embodiments, the bend 528 may be spaced apart from the inner and outer edges 516, 522 at varying distances, such as by being defined in each lamination 502 at a location closer to the inner edge 516 or at a location closer to the outer edge 522.

Additionally, it should be appreciated that, although the laminations 502 shown in FIGS. 9 and 10 are configured to be assembled together to form a stand-alone tooth module, the disclosed nesting feature 528 (e.g., the axially projecting bend 528) may be utilized with laminations 502 configured to form any other suitable stator, such as a single- or double-sided stator. For instance, referring back to FIGS. 2 and 3, as an alternative to the curved profile, an axially projecting bend 528 may be formed in each lamination 102 that extends between the first and second side edges 118, 120, 124, 126.

Referring now to FIGS. 11 and 12, there is illustrated a further embodiment of a lamination stack 600 having a plurality of laminations 602 that may be stacked axially or otherwise assembled together to form at least a portion of an electrical machine stator 22 (FIG. 2). In particular, FIG. 11 illustrates a perspective view of the lamination stack 600. Additionally, FIG. 12 illustrates a cross-sectional view of the lamination stack 600 shown in FIG. 11 taken along line 12-12, particularly illustrating several adjacent, nesting laminations 602 of the lamination stack 600.

As shown, the lamination stack 600 may generally be configured the same as or similar to the lamination stacks 200, 500 described above with reference to FIGS. 4, 9 and 10. For example, the lamination stack 600 may generally comprise a stand-alone tooth module of an electrical machine stator 22 (FIG. 1) and, thus, may define a single stator tooth 606 configured to receive a suitable stator winding 30, 32 (FIG. 1). Thus, each lamination 602 may generally include an inner edge 616, an outer edge 622 and first and second side edges 618, 620 extending radially between the inner and outer edges 616, 622, with the stator tooth 606 of the lamination stack 600 being partially defined between the first and second side edges 618, 620 of each lamination 602.

In addition, each lamination 602 may include a nesting feature 628 defined between its first and second side edges 618, 620 such that adjacent laminations 602 may be engaged with one another when the laminations 602 are assembled together to form the lamination stack 602. However, unlike the nesting feature 528 described above, the nesting feature 628 may comprise an axially projecting bend 628 extending between the inner and outer edges 616, 622. For example, as shown in FIG. 12, the bend 628 formed in each lamination 602 may extend between the inner and outer edges 616, 622 so as to be spaced axially apart from the first and second side edges 618, 620, such as by being spaced apart from the side edges 618, 620 by an axial distance 650. As such, the axial projecting bend 628 of each lamination 602 may be configured to be received within and/or received by the corresponding axially projecting bends 628 of adjacent laminations 602. Accordingly, adjacent laminations 602 may be radially and/or circumferentially engaged against one another, thereby increasing the radial and/or circumferential stiffness of the lamination stack 600.

It should be appreciated that the bend 628 formed in each lamination 602 may generally define any suitable angle 652. For example, as shown in FIG. 12, in one embodiment, the angle 652 may be equal to about 90 degrees. However, in other embodiments, the angle 652 may be less than 90 degrees or greater than 90 degrees. Additionally, as shown in FIG. 11, in one embodiment, the bend 628 may be defined in each lamination 602 so as to extend substantially perpendicularly between the inner and outer edges 616, 622. In other embodiments, the bend 628 may extend at any other suitable angle between the inner and outer edges 616, 622.

Moreover, as shown in the illustrated embodiment, the bend 628 is defined in each lamination 602 at a location generally equidistant from the first and second side edges 618, 620. However, in alternative embodiments, the bend 628 may be spaced apart from the first and second side edges 618, 620 at varying distances, such as by being defined in each lamination 602 at a location closer to the first side edge 618 or at a location closer to the second side edge 620.

Additionally, it should be appreciated that, although the laminations 602 shown in FIGS. 11 and 12 are configured to be assembled together to form a stand-alone tooth module, the disclosed nesting feature 628 (e.g., the axially projecting bend 628) may be utilized with laminations 602 configured to form any other suitable stator, such as a single- or double-sided stator. For instance, referring back to FIGS. 2 and 3, as an alternative to the curved profile, an axially projecting bend 628 may be formed in each lamination 102 that extends between inner and outer edges 116, 122 and that is spaced apart between the first and second side edges 118, 120, 124, 126.

Referring now to FIGS. 13 and 14, there is illustrated yet another embodiment of a lamination stack 700 having a plurality of laminations 702, 703 that may be stacked axially or otherwise assembled together to form at least a portion of an electrical machine stator 22 (FIG. 1). In particular, FIG. 13 illustrates a perspective view of the lamination stack 700. Additionally, FIG. 14 illustrates a cross-sectional view of the lamination stack 700 shown in FIG. 13 taken along line 14-14, particularly illustrating several adjacent laminations 702, 703 of the lamination stack 700.

As shown, the lamination stack 700 may generally be configured the same as or similar to the lamination stacks 200, 500, 600 described above with reference to FIGS. 4 and 9-12. For example, the lamination stack 700 may be configured as a stand-alone tooth module of an electrical machine stator 22 (FIG. 1) and, thus, may define a single stator tooth 706 configured to receive a suitable stator winding 30, 32 (FIG. 1). However, unlike the embodiments described above, the lamination stack 700 is formed from laminations 702, 703 having differing configurations. Specifically, as shown in the illustrated embodiment, the lamination stack 700 may include a plurality of nesting laminations 702 configured to be at least partially engaged with one another, with each nesting lamination 702 including a radially inner edge 716, a radially outer edge 722, a first radially extending edge section 760, a second radially extending edge section 762 and a middle section 764 extending circumferentially (e,g., in the circumferential direction indicated by arrow 780 in FIG. 13) between the first and second edge sections 760, 762. Additionally, the lamination stack 700 may include a plurality of shim laminations 703, with one or more of the shim laminations 703 being disposed between each pair of adjacent nesting laminations 702. For example, as particularly shown in FIG. 14, a single shim lamination 703 may be disposed between the middle sections 764 of each pair of adjacent nesting laminations 702 such that the middle sections 764 are spaced apart by an axial distance 766. However, in alternative embodiments, two or more shim laminations 703 may be disposed between the middle sections 764 of each pair of adjacent nesting laminations 702. It should be appreciated that, in embodiments in which a single shim lamination 703 is disposed between adjacent nesting laminations 702, the axial distance 766 may generally correspond to the thickness 766 of each shim lamination 703.

In general, the first and/or second edge sections 760, 762 of each nesting lamination 702 may be configured to be engaged against the first and/or second edge sections 760, 762 of adjacent nesting laminations 702 when the laminations 702, 703 are assembled together to form the lamination stack 700. Thus, in several embodiments, the first and second edge sections 760 762 may be configured to project or extend outwardly relative to the middle section 760 (e.g., by being bent relative to the middle section 760) such that at least a portion of each edge section 760, 762 extends across the axial distance 766 and overlaps a corresponding edge section 760, 762 of an adjacent nesting lamination 702. For example, as shown in FIG. 14, the first and second edge sections 760, 762 may be oriented relative to the middle section 764 at an angle 768 such that at least a portion an inner surface 710 of each edge section 760, 762 is engaged against and overlaps at least a portion of an outer surface 710 of the corresponding edge sections 760, 762 of the adjacent nesting lamination 702. As a result, each nesting lamination 702 may be radially (e.g., in the radial direction indicated by arrow 782 in FIG. 13) and/or circumferentially engaged against adjacent nesting laminations 702, thereby increasing the radial and/or circumferential stiffness of the lamination stack 700.

It should be appreciated that the angle 768 at which each edge section 760, 762 must bent relative to the middle section 764 such that the edge sections 760, 762 of adjacent nesting lamination 702 engage one another may generally vary depending on the axial distance 766 defined between the middle sections 764 of adjacent nesting laminations 702 and a thickness 774 of each nesting lamination 702. For example, when the ratio of the axial distance 766 to the nesting lamination thickness 774 is equal to about 0.33:1, the angle 768 defined at each edge section 760, 762 may generally be equal to about 40 degrees. Similarly, when the ratio of the axial distance 766 to the nesting lamination thickness 774 is equal to about 1:1, the angle 768 defined at each edge section 760, 762 may generally be equal to about 60 degrees. As another example, when the ratio of the axial distance 766 to the nesting lamination thickness 774 is equal to about 2:1, the angle 768 defined at each edge section 760, 762 may generally be equal to about 70 degrees and when the ratio is equal to about 5:1, the angle 768 defined at each edge section 760, 762 may generally be equal to about 80 degrees. Thus, in several embodiments, the angle 768 defined at each edge section 760, 762 may generally range from about 40 degrees to about 80 degrees (corresponding to a ratio of the axial distance 766 to the nesting lamination thickness 774 ranging from about 0.33:1 to about 5:1), such as from about 45 degrees to about 75 degrees or from about 60 degrees to about 70 degrees and all other subranges therebetween. However, in alternative embodiments, the angle 768 defined at each edge section 760, 762 may be less than about 40 degrees or greater than about 80 degrees.

Additionally, it should be appreciated that, in several embodiments, the thickness (reference character 766 in the illustrated embodiment) of each shim lamination 703 may be equal to the thickness 774 of each nesting lamination 702. In such embodiments, the axial distance to nesting lamination thickness ratio may be incrementally varied (e.g., from 1:1 to 2:1 or from 1:1 to 3:1) by varying the number of shim laminations 703 disposed between adjacent nesting laminations 702 (e.g., by varying the number from one shim lamination 703 to two shim laminations 703 or from one shim lamination 703 to three shim laminations 703). However, in other embodiments, the thickness of each shim lamination 703 may vary from the thickness of each nesting lamination 702.

Referring still to FIGS. 13 and 14, in several embodiments, each shim lamination 703 and the middle section 764 of each nesting lamination 702 may generally define a substantially flat or planar configuration. As such, the shim laminations 703 and middle sections 764 of the nesting laminations 702 may be positioned flush against one another when the laminations 702, 702 are stacked together axially. Additionally, as particularly shown in FIG. 14, in one embodiment, a side edge 776 of each shim lamination 703 may have a beveled or tapered configuration so as to generally correspond to the orientation or angle 768 of the inner surfaces 770 of the edge sections 760, 762, thereby creating a flush interface between the side edges 776 and the inner surfaces 770. However, in alternative embodiments, the side edges 776 may have any other suitable configuration and, thus, need not be designed so as to correspond to the orientation or angle 768 of the inner surfaces 700 of the edge sections 760, 762

Moreover, it should be appreciated that, although the transition defined between each side section 760, 762 and the middle section 764 of each nesting lamination 702 is shown in FIGS. 13 and 14 as being a sharp fold or bend (i.e. defining a sharp edge), a curved transition may also be defined between each side section 760, 762 and the middle section 764 of each nesting lamination 702. Additionally, it should be appreciated that, although the nesting and shim laminations 702, 703 shown in FIGS. 13 and 14 are configured to be assembled together to form a stand-alone tooth module, the laminations 702, 703 may also be configured to form any other suitable stator, such as a single- or double-sided stator.

It should be appreciated that the disclosed nesting features 128, 228, 328, 428, 528, 628 and/or edge sections 760, 762 may generally be formed in each lamination 102, 202, 302, 402, 502, 602, 702 using any suitable manufacturing process. For example, in one embodiment, the nesting features and/or edge sections may be formed using a stamping or rolling process.

Referring now to FIGS. 15 and 16, there is illustrated one example of an electrical machine (i.e., a wind turbine generator) in which the disclosed laminations may be advantageously used. In particular, FIG. 15 illustrates a partial, cross-sectional view of one embodiment of a wind turbine 800 having a generator 802 installed therein. Additionally, FIG. 16 illustrates an enlarged, cross-sectional view of a portion of the wind turbine 800 shown in FIG. 15, particularly illustrating various components of the generator 802.

As shown, the wind turbine 800 generally includes a nacelle 804 mounted on top of a tower 806 (only a portion of which is shown). In several embodiments, the nacelle 804 may include a nacelle frame 808 and a nacelle cover 810. The nacelle frame 808 may generally be configured to be mounted to a portion of the tower 806, such as through a conventional yaw bearing and gear drive system (not shown). The nacelle cover 810 may generally be configured to encompass the wind turbine components contained within the nacelle 804, thereby protecting such components from the outside environment.

Additionally, the wind turbine 800 may include rotor hub 812 having a plurality of rotor blades 814 (only a portion of which is shown) extending therefrom. For example, in one embodiment, the wind turbine 800 may include three rotor blades 814 extending outwardly from the rotor hub 812. However, in alternative embodiments, the wind turbine 800 may include less than three rotor blades 814 or greater than three rotor blades 814. Moreover, in one embodiment, the rotor hub 812 may include a hub cover 816 configured to encompass various other rotor components of the wind turbine 800 (e.g., pitch drive assemblies and the like).

Further, the wind turbine 800 may also include a generator 802 mounted to the nacelle frame 808 via a main shaft and bearing assembly 818. As shown in the illustrated embodiment, the generator 802 may be configured as a direct drive, double-sided permanent magnet (PM) generator. Thus, as particularly shown in FIG. 2, the generator 802 may include a rotor 820 having an outer rotor portion 822 and an inner rotor portion 822. A plurality of outer magnets 826 may extend radially inwardly from the outer rotor portion 822. Similarly, a plurality of inner magnets 828 may extend radially outwardly from the inner rotor portion 825.

Additionally, the generator 802 may include a stator 830 fixed in position relative to the rotor 820. For example, the stator 830 may be coupled to a stationary frame 832 of the generator 802. As shown in the illustrated embodiment, the stator 830 is configured as a double-sided stator and, thus, includes an outer stator portion 834 and an inner stator portion 836. The outer stator portion 834 may generally include a plurality of radially outwardly extending stator teeth (not shown), with each outer stator tooth being configured to receive an outer stator winding 838. Similarly, the inner stator portion 836 may include a plurality of radially inwardly extending stator teeth (not shown), with each outer stator tooth being configured to receive an inner stator winding 840.

It should be appreciated that the stator 830 may generally be concentrically disposed relative to the rotor 820, such as by being concentrically disposed between the outer and inner rotor portions 822, 824. As such, at least two concentric air gaps 842, 844 may be defined between the stator 830 and the inner and outer rotor portions 822, 824. For example, an inner air gap 842 may be defined between the inner rotor portion 824 and the inner stator portion 836 and an outer air gap 844 may be defined between the outer rotor portion 822 and the outer stator portion 834.

During operation of the generator 802, power output from the stator 830 may be controlled by a power converter unit (not shown) capable of full power conversion. A rotor shaft 846 may be coupled to the rotor 820 via a rotating frame 848 at one end and to a hub flange 850 at the other end, which may be coupled to the rotor hub 812. As a result, rotation of the rotor blades 814 and, thus, the rotor hub 812 may rotate the rotor shaft 846, thereby rotating the rotor 820 relative to the stator 830. As is generally understood, such rotation of the rotor 820 may create a rotating magnetic field which induces an electromotive force within the stator 830.

Additionally, as is generally understood, the stator 820 may be formed from a lamination stack 852 having a plurality of laminations (not shown) stacked axially together. As shown in FIG. 2, in one embodiment, the lamination stack 852 may be mounted to the stationary frame 832 using a plurality of bolts 854 extending axially through the lamination stack 852. End plates 856 disposed at the axial ends of the lamination stack 852, together with the heads of the bolts 854, may be configured to provide uniform compression of the lamination stack 852.

It should be appreciated that, in accordance with several embodiments of the present subject matter, the lamination stack 852 shown in FIG. 16 may generally be configured the same as or similar to any of the lamination stacks 100, 200, 300, 400, 500, 600, 700 described above. Accordingly, the lamination stack 852 may include suitable nesting features 128, 228, 328, 428, 528, 628 and/or suitable nesting laminations 702 configured to increase the radial and/or circumferential stiffness of the lamination stack 852, thereby improving the torque and/or shear carrying capability of the lamination stack 852.

It should also be appreciated that, although the illustrated wind turbine 10 is shown in FIGS. 15 and 16 as including a direct drive, double-sided PM generator 800, the wind turbine 10 may generally include any other suitable wind turbine generator known in the art, such as any suitable single-sided generator, any suitable non-PM generator (e.g., wound field synchronous machines and switched or synchronous reluctance machines) or any other suitable wind turbine generator (e.g., an indirectly driven generator). In such embodiments, the disclosed lamination stacks 100, 200, 300, 400, 500, 600, 700 may be utilized within such generator to form a stator having an increased torque and/or shear carrying capability.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electrical machine stator, comprising:
a stack of laminations configured to be assembled together so as to define at least one stator tooth, the stack of laminations comprising:
a plurality of nesting laminations, each of the nesting laminations including a first edge section, a second edge section and a middle section extending circumferentially between the first and second edge sections, each of the nesting laminations further including a radially outer edge and a radially inner edge, at least one of the first edge section or the second edge section of each of the nesting laminations being configured to be engaged against at least one of the first edge section or the second edge section of an adjacent nesting lamination when the stack of laminations is assembled together; and
a plurality of shim laminations, at least one shim lamination being disposed between each pair of adjacent nesting laminations, each of the shim laminations defining a substantially planar profile,
wherein the middle section of each of the nesting laminations defines a substantially planar profile extending radially from the radially outer edge to the radially inner edge.

2. The electrical machine stator of claim 1, wherein the first and second edge sections are angled relative to the middle section.

3. The electrical machine stator of claim 2, wherein an angle defined between the middle section and the first and second edge sections ranges from about 40 degrees to about 80 degrees.

4. The electrical machine stator of claim 3, wherein each shim lamination includes a tapered side edge corresponding to the angle defined between the middle section and the first and second edge sections.

5. The electrical machine stator of claim 1, wherein each nesting lamination defines a first thickness and each shim lamination defines a second thickness, wherein the first and second thicknesses are equal to one another or differ from one another.

6. The electrical machine stator of claim 1, wherein an inner surface of the first and second edge sections of each nesting laminations is configured to be engaged against an outer surface of the first and second edge sections of the adjacent nesting lamination when the stack of laminations is assembled together.

7. A generator for a wind turbine, comprising:
a rotor; and
a stator fixed in position relative to the rotor, the stator including a plurality of radially extending stator teeth, at least one of the plurality of stator teeth being formed from a stack of laminations configured to be assembled together, the stack of laminations comprising:

a plurality of nesting laminations, each of the nesting laminations including a first edge section, a second edge section and a middle section extending circumferentially between the first and second edge sections, each of the nesting laminations further including a radially outer edge and a radially inner edge, at least one of the first edge section or the second edge section of each of the nesting laminations being configured to be engaged against at least one of the first edge section or the second edge section of an adjacent nesting lamination when the stack of laminations is assembled together; and a plurality of shim laminations, at least one shim lamination being disposed between each pair of adjacent nesting laminations, each of the shim laminations defining a substantially planar profile, wherein the middle section of each of the nesting laminations defines a substantially planar profile extending radially from the radially outer edge to the radially inner edge.

8. The generator of claim 7, wherein the first and second edge sections are angled relative to the middle section.

9. The generator of claim 8, wherein an angle defined between the middle section and the first and second edge sections ranges from about 40 degrees to about 80 degrees.

10. The generator of claim 9, wherein each shim lamination includes a tapered side edge corresponding to the angle defined between the middle section and the first and second edge sections.

11. The generator of claim 7, wherein each nesting lamination defines a first thickness and each shim lamination defines a second thickness, wherein the first and second thicknesses are equal to one another or differ from one another.

12. The generator of claim 7, wherein an inner surface of the first and second edge sections of each nesting laminations is configured to be engaged against an outer surface of the first and second edge sections of the adjacent nesting lamination when the stack of laminations is assembled together.

13. A wind turbine, comprising:

a tower;

a nacelle mounted on top of the tower;

a rotor hub coupled to the nacelle, the rotor hub having a plurality of rotor blades extending therefrom; and a generator housed within the nacelle, the generator comprising a rotor and a stator fixed in position relative to the rotor, the stator including a plurality of radially extending stator teeth, at least one of the plurality of stator teeth being formed from a stack of laminations configured to be assembled together, the stack of laminations comprising:

a plurality of nesting laminations, each of the nesting laminations including a first edge section, a second edge section and a middle section extending circumferentially between the first and second edge sections, each of the nesting laminations further including a radially inner edge and a radially outer edge, at least one of the first edge section or the second edge section of each of the nesting laminations being configured to be engaged against at least one of the first edge section or the second edge section of an adjacent nesting lamination when the stack of laminations is assembled together; and a plurality of shim laminations, at least one shim lamination being disposed between each pair of adjacent nesting laminations, each of the shim laminations defining a substantially planar profile, wherein the middle section of each of the nesting laminations defines a substantially planar profile extending radially from the radially outer edge to the radially inner edge.

14. The electrical machine stator of claim 1, wherein the first and second edge sections extend radially along either side of the middle section from the radially outer edge to the radially inner edge of each nesting lamination.

15. The electrical machine stator of claim 1, wherein a transition is defined between the middle section and each of the first and second edge sections, the transition extending radially along an entire radial height defined between the radially outer and radially inner edges.

16. The electrical machine stator of claim 1, wherein the at least one shim limitation is disposed directly between the middle sections of each pair of adjacent nesting laminations.

17. The generator of claim 7, wherein the first and second edge sections extend radially along either side of the middle section from the radially outer edge to the radially inner edge of each nesting lamination.

18. The generator of claim 7, wherein a transition is defined between the middle section and each of the first and second edge sections, the transition extending radially along an entire radial height defined between the radially outer and radially inner edges.

19. The generator of claim 7, wherein the at least one shim limitation is disposed directly between the middle sections of each pair of adjacent nesting laminations.

\* \* \* \* \*